(12) United States Patent
Sato

(10) Patent No.: US 6,965,995 B1
(45) Date of Patent: Nov. 15, 2005

(54) SIGNAL PROCESSING CIRCUIT

(75) Inventor: Sadaharu Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/442,727

(22) Filed: Nov. 18, 1999

(30) Foreign Application Priority Data

Nov. 19, 1998 (JP) ................................. 10-329973

(51) Int. Cl.[7] ............................................. H04L 9/00
(52) U.S. Cl. ....................................... 713/160; 713/151
(58) Field of Search ......................... 380/255, 200–203, 380/28; 713/150–153, 160, 161

(56) References Cited

U.S. PATENT DOCUMENTS

| | | | | |
|---|---|---|---|---|
| 4,757,536 A | * | 7/1988 | Szczutkowski et al. ..... | 380/274 |
| 4,817,146 A | * | 3/1989 | Szczutkowski et al. ..... | 380/261 |
| 5,081,678 A | * | 1/1992 | Kaufman et al. ........... | 713/161 |
| 5,896,454 A | * | 4/1999 | Cookson et al. ............... | 360/60 |
| 5,978,481 A | * | 11/1999 | Ganesan et al. ............ | 380/266 |
| 6,055,316 A | * | 4/2000 | Perlman et al. ............. | 380/262 |
| 6,118,873 A | * | 9/2000 | Lotspiech et al. .......... | 380/277 |
| 6,223,285 B1 | * | 4/2001 | Komuro et al. ............. | 713/160 |
| 6,259,694 B1 | * | 7/2001 | Sato et al. ................... | 370/389 |
| 6,343,281 B1 | * | 1/2002 | Kato ............................ | 705/57 |
| 6,408,012 B1 | * | 6/2002 | Sato ........................... | 370/545 |
| 6,463,060 B1 | * | 10/2002 | Sato et al. ................... | 370/389 |
| 6,463,151 B1 | * | 10/2002 | Iitsuka et al. ................ | 380/201 |
| 6,467,093 B1 | * | 10/2002 | Inoue et al. ................. | 725/151 |
| 6,490,355 B1 | * | 12/2002 | Epstein ........................ | 380/203 |
| 6,526,146 B1 | * | 2/2003 | Hashimoto et al. ......... | 380/201 |
| 6,539,094 B1 | * | 3/2003 | Osakabe et al. ............. | 380/283 |
| 6,611,534 B1 | * | 8/2003 | Sogabe et al. ............... | 370/471 |
| 6,622,249 B1 | * | 9/2003 | Komuro et al. ............. | 713/200 |
| 6,636,551 B1 | * | 10/2003 | Ikeda et al. ................. | 375/130 |
| 6,690,798 B1 | * | 2/2004 | Dent ........................... | 380/248 |

FOREIGN PATENT DOCUMENTS

| EP | 0 874 503 | 10/1998 | |
|---|---|---|---|
| EP | 0913975 A2 | * 5/1999 | ........... H04L 29/06 |

OTHER PUBLICATIONS

"IEEE Standard for a High Performance Serial Bus", Jul. 22, 1996, IEEE Standards, p. 1-384.*
"5C Digital Transmission Content Protection White Paper" Internet Citation, Jul. 14, 1998, XP002213172 Retrieved from the Internet: <URL:http://www.dtcp.com/data/wp_spec.pdf> 'retrieved on Sep. 11, 2002!.

* cited by examiner

*Primary Examiner*—Ayaz Sheikh
*Assistant Examiner*—Christopher Revak
(74) *Attorney, Agent, or Firm*—Frommer Lawrence & Haug LLP; William S. Frommer; Thomas F. Presson

(57) ABSTRACT

A signal processing circuit capable of preventing illicit copies, preventing the circuit from being unable to discriminate a plurality of cipher mode and unable to decipher, and correctly decipher received data at the reception side, configured to be provided with a cipher mode continuity discrimination circuit which confirms the continuity of a cipher mode at the time of reading transmission data from an FIFO when transmitting a plurality of packets, stops the transmission when a discontinuity is confirmed even if there is room in a band enabling transmission in the transmission cycle of the 1394 standard, and instructs a link core to transmit the packet enciphered by a different cipher key at the next cycle, so that only the data enciphered by one cipher mode is transmitted within one cycle of the 1394 standards, and the data enciphered by a different cipher mode is transmitted in the next cycle.

8 Claims, 14 Drawing Sheets

FIG.2A

| sy[3:2] | CIPHER MODE | CONTENTS |
|---|---|---|
| 11 | MODE A | Never Copy |
| 10 | MODE B | Copy Once |
| 01 | MODE C | No More Copy |
| 00 | NO ENCIPHER | Copy Free |

FIG.2B

| sy[1] | KIND OF CIPHER KEY |
|---|---|
| 1 | Even Key |
| 0 | Odd Key |

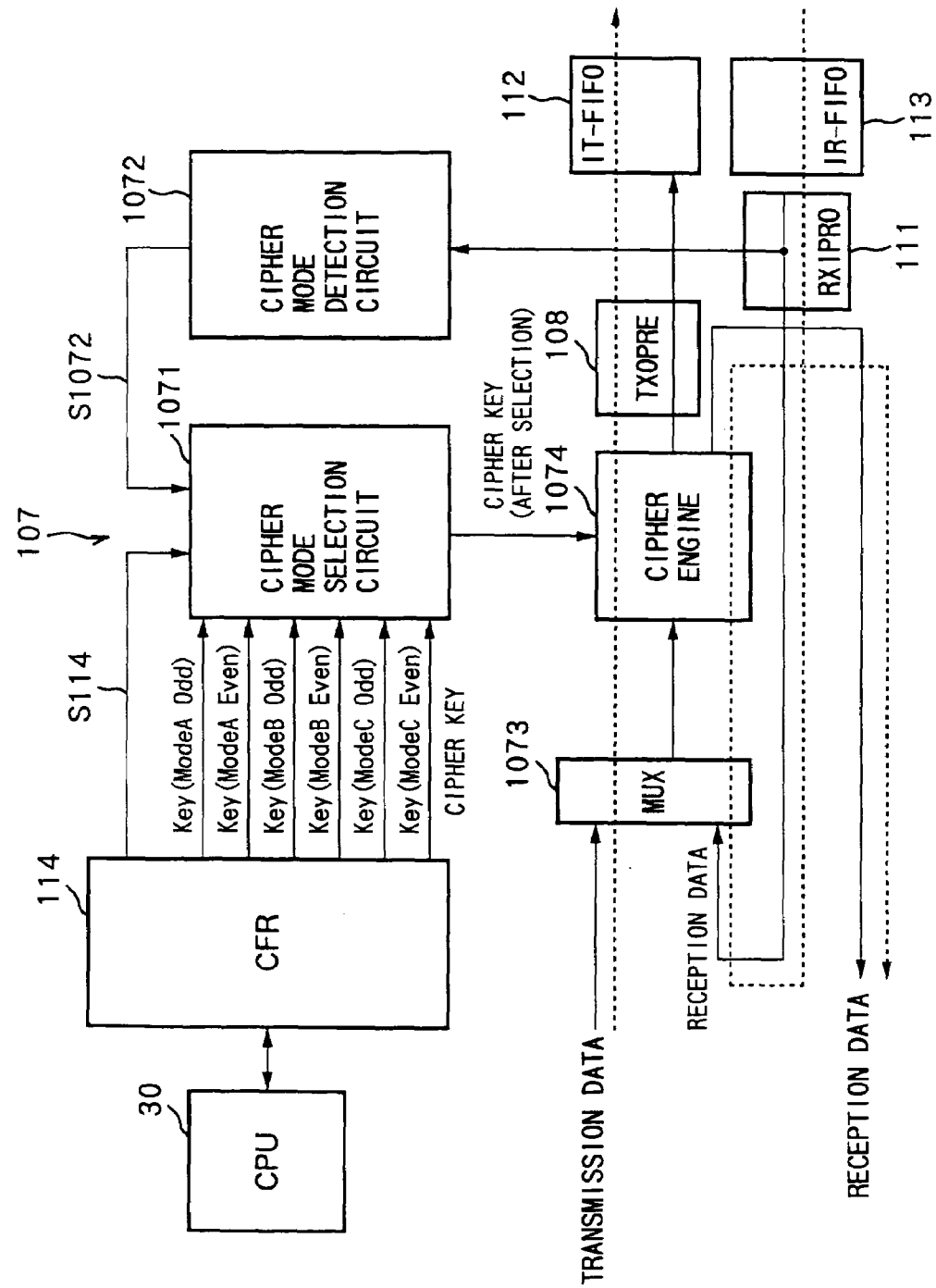

FIG. 4A

TimeStamp: sy[3:1] | 35 34 33 32 31 30 29 28 27 26 25 24 23 22 21 20 19 18 17 16 15 14 13 12 | 11 10 9 8 7 6 5 4 3 2 1 0

CC → CycleCount
CO → CycleOffset

FIG. 4B

Data: sy[3:1] | 35 34 33 32 31 30 29 28 27 26 25 24 23 22 21 20 19 18 17 16 15 14 13 12 11 10 9 8 7 6 5 4 3 2 1 0

DataPayload

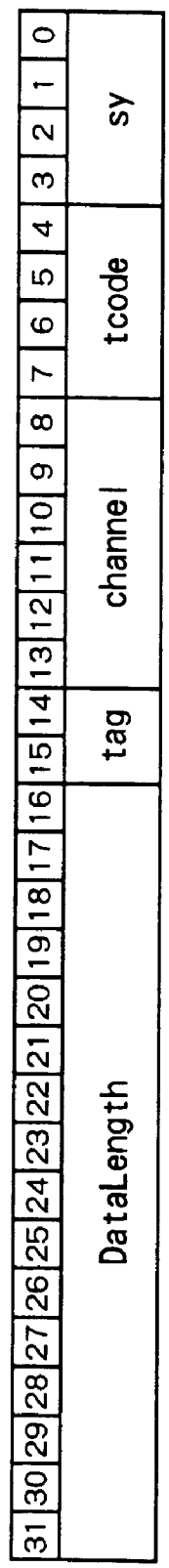

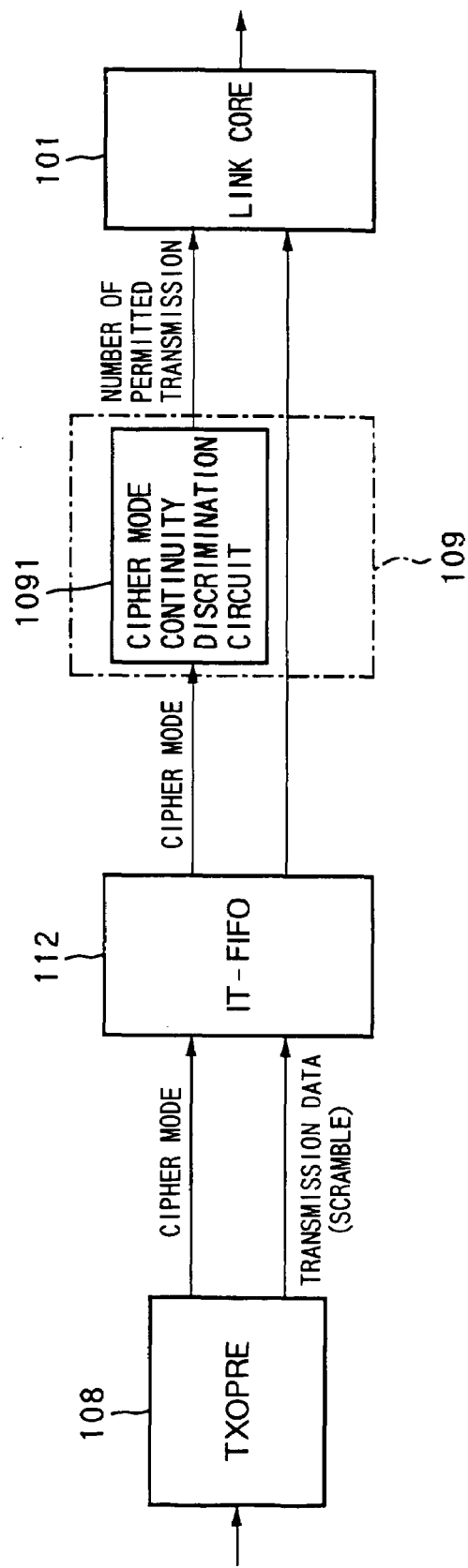

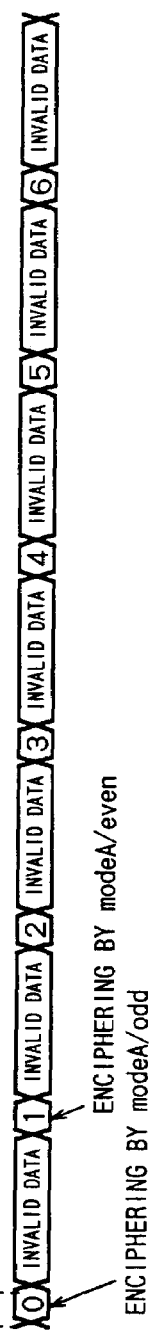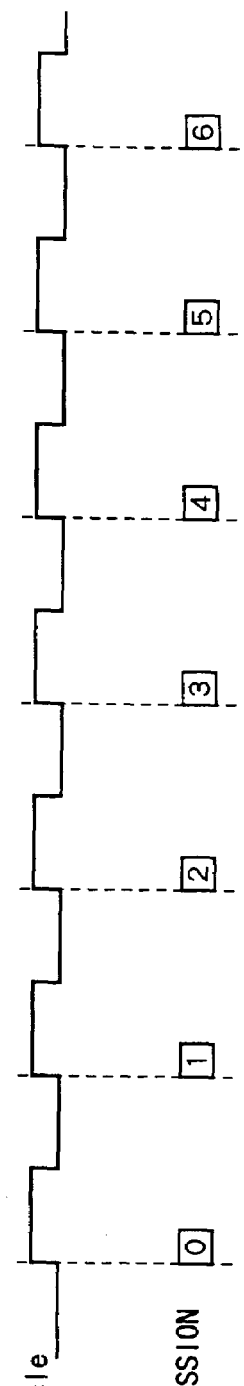

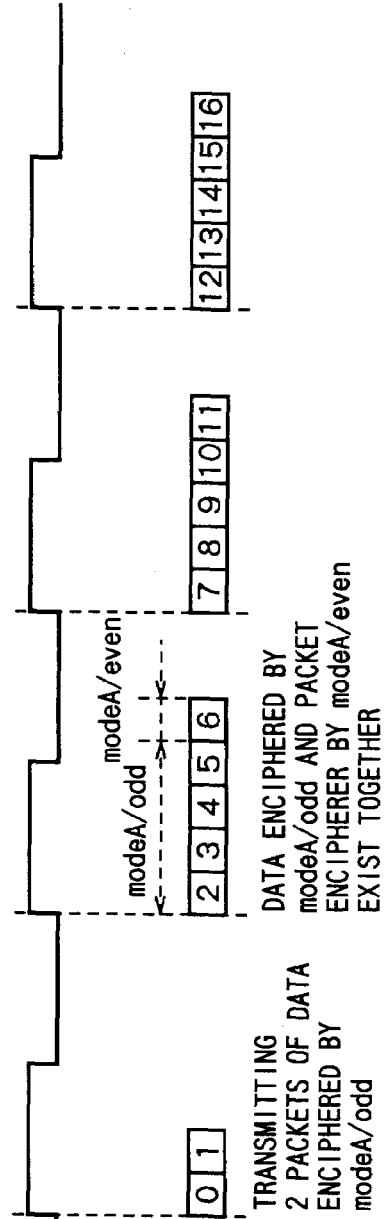

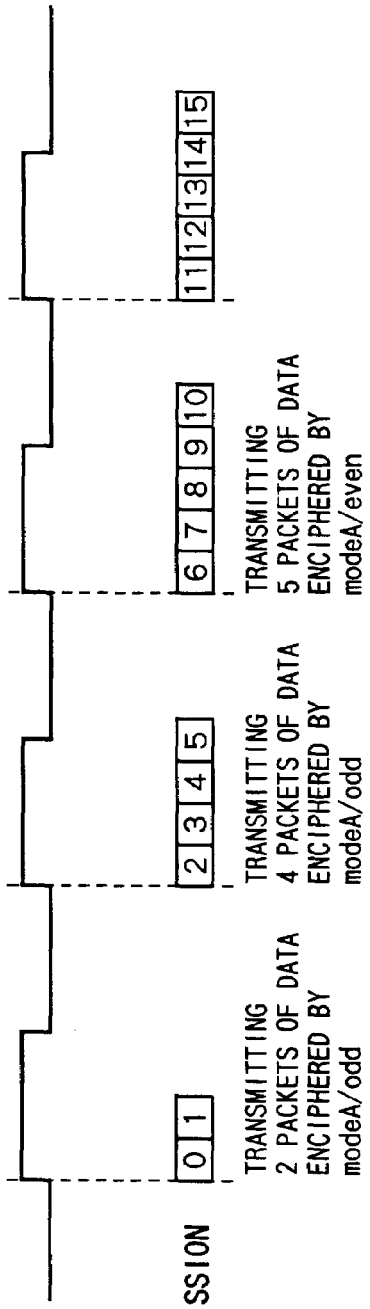

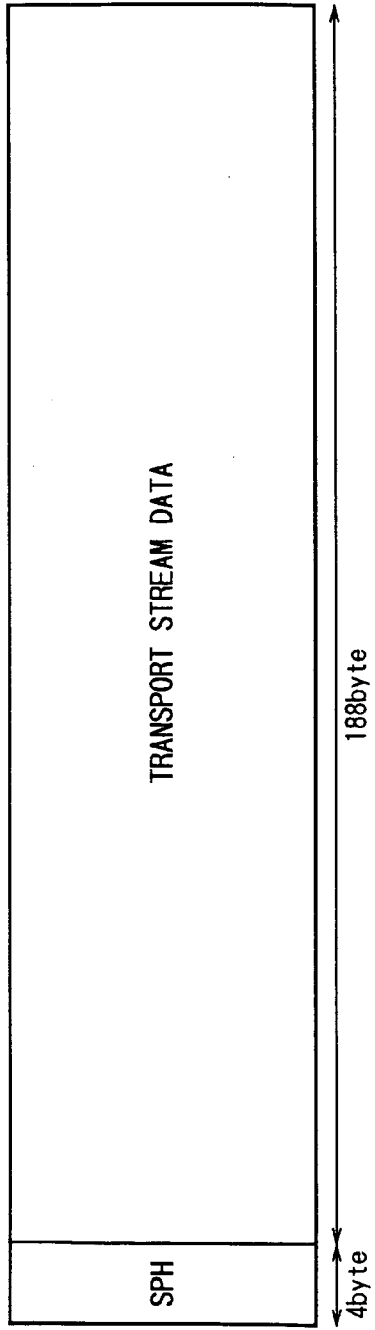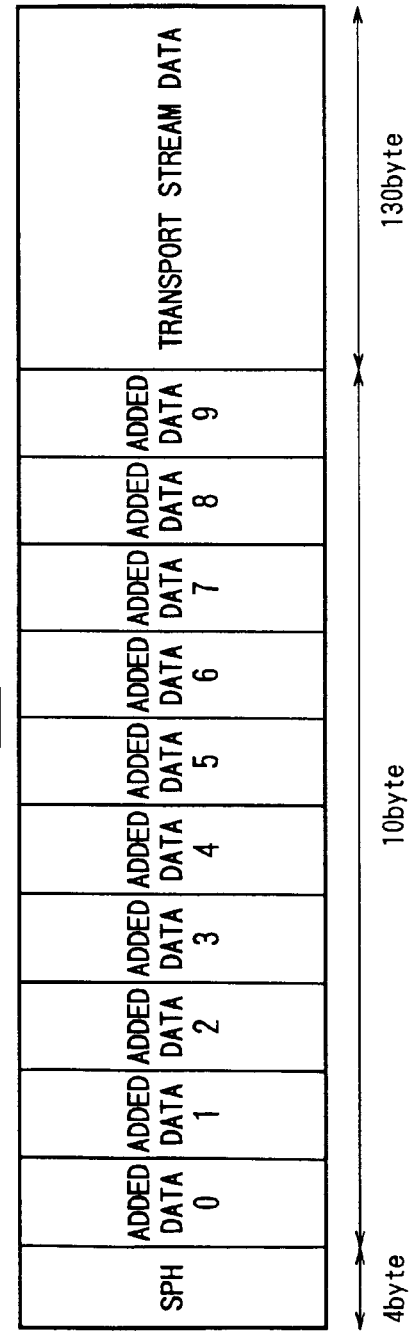

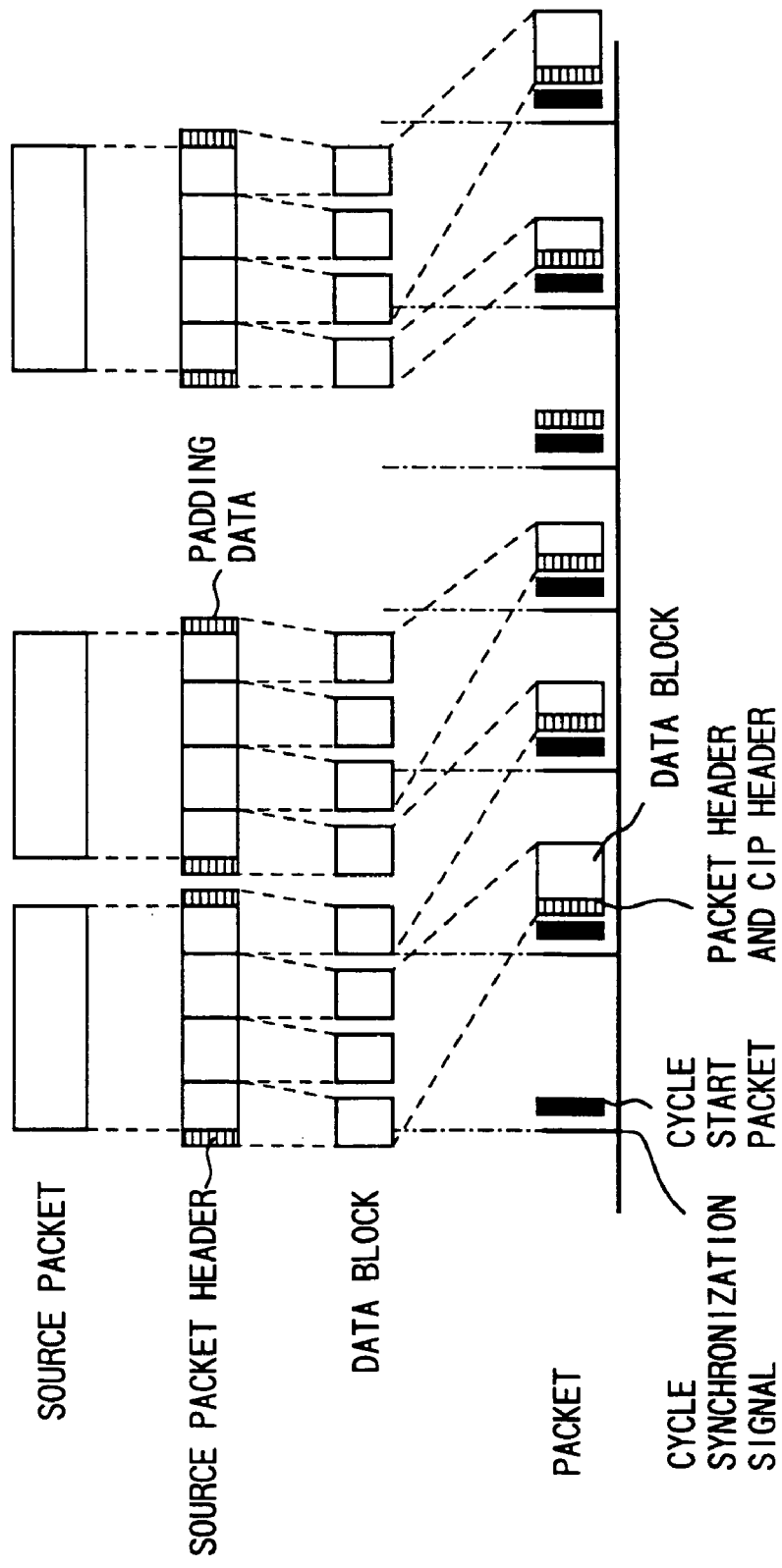

SIGNAL PROCESSING CIRCUIT

BACKGROUND OF THE INVENTION

1. Field of the Invention

The present invention relates to a signal processing circuit used for a digital serial interface, more particularly relates to a data cipher circuit.

2. Description of the Related Art

As an interface for multimedia data transfer, an IEEE (The Institute of Electrical and Electronic Engineers) 1394 high performance serial bus which realizes high speed data transfer and real-time transfer has recently been standardized.

The data transfer by the IEEE 1394 serial interface includes the conventional asynchronous transfer for making requests, acknowledging requests, and acknowledging receipt and isochronous transfer wherein data is always sent once per 125 μs from a certain node.

In the IEEE 1394 serial interface having such two transfer modes, data is transferred in units of packets.

FIGS. 10A and 10B are views of a byte size of one source packet in the isochronous transfer. FIG. 10A shows the packet size in a digital video broadcast (DVB) specification and FIG. 10B shows the packet size in a digital satellite system (DSS) specification.

The source packet size in the DVB specification is, as shown in FIG. 10A, 4 bytes of a source packet header (SPH) plus 188 bytes of transport stream data, that is, 192 bytes.

The source packet size in the DSS specification is, as shown in FIG. 10B, 4 bytes of a source packet header (SPH), 10 bytes of added data, and 130 bytes of data, that is, 144 bytes.

The added data is inserted between the source packet header and the data. Note that since the unit of maximum data to be handled is 1 quadlet (=4 bytes=32 bits) in the IEEE 1394 standard, it is necessary to set things to enable the sum of the transport data and the added data to be configured in units of 32 bits.

Note that it can be set without the added bytes at default.

FIG. 11 is a view of an example of the correspondence of original data at the time of transferring data by isochronous communication of the IEEE 1394 standard and packets actually transferred.

As shown in FIG. 11, a source packet of the original data is given 4 bytes of the source packet header and padding data for adjusting the data length, then is divided into a predetermined number of data blocks.

Note that since the unit of data at the time of transferring a packet is 1 quadlet (4 bytes), the byte length of the data block and a variety of headers are set to be multiples of 4.

FIG. 12 is a view of the format of a source packet header.

As shown in FIG. 12, a time stamp used for controlling jitter is written in 25 bits in the source packet header, for example, when MPEG (Moving Picture Experts Group)-TS (transport stream) data used in digital satellite broadcasts etc. of the above DVB mode is transferred by isochronous communication.

Then, data such as the packet header, common isochronous packet (CIP) header, etc. is added to a predetermined number of data blocks to generate a packet.

FIG. 13 is a view of an example of the basic configuration of a packet in isochronous communication.

The packet in isochronous communication is configured, as shown in FIG. 13, of a first quadlet comprising a 1394 header, a second quadlet comprising a header-CRC, a third quadlet comprising a CIP header 1, a fourth quadlet comprising a CIP header 2, a fifth quadlet comprising a source packet header (SPH), and a sixth quadlet on comprising a data region. The last quadlet comprises a data-CAC.

The 1394 header is composed of a data-length region indicating the data length, a channel region indicating the number of the channel to which the packet is transferred (one of 0 to 63), a tcode region indicating a processing code, and a synchronization code sy region defined by the application.

The header-CRC is an error detection code of the packet header.

The CIP header 1 is configured by a source node ID (SID) region for a transfer node number, a data block size (DBS) region for a data block length, a fraction number (FN) region for a fraction number of data in making a packet, a quadlet padding count (QPC) region for a quadlet number of padding data, an SPH region for a flag indicating an existence of a source packet header, and a data block continuity counter (DBC) region for a counter for detecting a number of isochronous packets.

Note that the DBS region indicates the number of quadlets to be transferred in one isochronous packet.

The CIP header 2 is composed of an FMT region for a signal format indicating a kind of data to be transferred and a format dependent field (FDF) region used corresponding to a signal format.

The SPH header includes a time stamp region in which is set a value for giving a fixed delay value at the time when a transport stream packet arrives.

The data-CRC is an error detection code of a data field.

A signal processing circuit of the IEEE 1394 serial interface for transfer of a packet having the above configuration is composed of, as shown in FIG. 14, a physical layer circuit 1 for directly driving an IEEE 1394 serial bus and a link layer circuit 2 for controlling the data transfer of the physical layer circuit 1.

In the above isochronous communication system of the IEEE serial interface, for example as shown in FIG. 14, the link layer circuit 2 is connected to the serial interface bus BS via the physical layer circuit 1.

Also, the link layer circuit 2 is connected to an application side circuit 3 such as an MPEG transporter, a digital video cassette recorder (DVCR), etc.

Currently, video data of movies and TV broadcasts is made unable to be freely, digitally recorded in the home etc. in order to prevent illicit copying infringing copyrights etc. Therefore, for example, a set-top box for receiving digital satellite broadcasts is not provided with a digital output terminal.

However, an IEEE 1394 serial interface is an interface for transmitting digital data of video, music, etc. between separate apparatuses. Furthermore, with home use digital recording apparatuses being actively developed and offered for practical use, an increase of opportunities for digital recording at the home etc. is inevitable.

Therefore, considering such a situation, a function for effectively preventing illicit copying is thus necessary. No configuration provided with this function has yet been realized in signal processing circuits of IEEE 1394 serial interfaces.

Also, when realizing such encipher functions, it is necessary to prevent the problem, at the time of successively transmitting a plurality of packet data, of the receiving side becoming unable to discriminate the cipher mode and unable to decipher when data enciphered in different cipher modes exist together in one transmission cycle.

SUMMARY OF THE INVENTION

An object of the present invention is to provide a signal processing circuit which can prevent illicit copying of digital data transmitted between separate apparatuses, prevent the receiving side from becoming unable to discriminate a plurality of cipher modes and unable to decipher, and correctly decipher received data at the receiving side.

To attain the above object, the present invention provides a signal processing circuit for transmitting data to be transmitted as a packet data to a serial interface bus in a predetermined time cycle, comprising: a cipher processing circuit for enciphering the data to be transmitted by a predetermined cipher mode and a transmission circuit for adding the enciphering information to the data enciphered in the cipher processing circuit, transmitting the result to the serial interface bus, confirming the continuity of the cipher mode by the enciphering information when transmitting a plurality of packets, and transmitting the data enciphered by a different cipher mode to the serial interface bus as packet data in the other cycle when a discontinuity is confirmed.

Further, in the present invention, the transmission circuit sets the enciphering information in a predetermined region of a header of the packet.

Further, the present invention provides a signal processing circuit for transmitting data to be transmitted as packet data to a serial interface bus in a predetermined time cycle, comprising: a holding means in which information of at least one cipher mode is set; a control means for specifying a mode to encipher transmission data; a cipher processing circuit including a cipher mode selection circuit for selecting cipher mode information specified by the control means from the holding means and a cipher engine circuit for enciphering the data to be transmitted in the cipher mode selected in the cipher mode selection circuit and outputting the enciphered data; a transmission circuit for adding the enciphering information to the enciphered data in the cipher processing circuit, transmitting the result to the serial interface bus, confirming the continuity of the cipher mode by the enciphering information when transmitting a plurality of packets, and transmitting the data enciphered by a different cipher mode to the serial interface bus as packet data in the other cycle when a discontinuity is confirmed.

Further, the present invention provides a signal processing circuit for transmitting data to be transmitted as packet data to a serial interface bus in a predetermined time cycle, comprising: a storing means; a holding means in which information of at least one cipher mode is set; a control means for specifying a mode to encipher the transmission data; a cipher processing circuit including a cipher mode selection circuit for selecting cipher mode information specified by the control means from the holding means and a cipher engine circuit for enciphering the data to be transmitted in the cipher mode selected in the cipher mode selection circuit and outputting the enciphered data; a first transmission circuit for generating time information to output received data on a receiving side to an application side, adding to the time information the enciphering information, and storing the result in the storing means along with the enciphered data; and a second transmission circuit for reading enciphered data to which has been added time information and enciphering information stored in the storing means, generating packet data in a predetermined format, setting the enciphering information in the packet header, and transmitting the result to the serial interface bus and, when transmitting a plurality of packets, confirming continuity of the cipher mode from the enciphering information, stopping the transmission when confirming a discontinuity even if there is room in a band enabling transmission in the predetermined time cycle, and transmitting the data enciphered by a different cipher mode to the serial interface bus as packet data in the next cycle.

Further, the present invention provides a signal processing circuit for transmitting data to be transmitted as packet data to a serial interface bus in a predetermined time cycle, wherein the enciphered packet data to be transmitted in the serial interface bus in a predetermined cycle is received and output to the application side, comprising: a cipher processing circuit for enciphering the data to be transmitted by a predetermined cipher mode at the time of transmission and deciphering the received enciphered data based on the enciphering information included in the received packet data at the time of reception and a transmission circuit for adding the enciphering information to the enciphered data in the cipher processing circuit, transmitting the result to the serial interface bus, confirming the continuity of the cipher mode by the enciphering information when transmitting a plurality of packets, and transmitting the data enciphered by a different cipher mode to the serial interface bus as packet data in the other cycle when a discontinuity is confirmed.

Further, the present invention provides a signal processing circuit for transmitting data to be transmitted as packet data to a serial interface bus in a predetermined time cycle, wherein the enciphered packet data to be transmitted in the serial interface bus in a predetermined cycle is received and output to the application side, comprising: a first storing means; a second storing means; a holding means in which information of at least one cipher mode is set; a control means for specifying a mode encipher the transmission data; a first reception circuit for storing time information, enciphered data and the enciphering information from the received packet data in the first storing means; a second reception circuit for outputting the enciphering information and the enciphered data stored in the first storing means and indicating a time to be output the received data to an application side based on the time information, a cipher processing circuit including a cipher mode detection circuit for detecting a cipher mode used for enciphering data by the enciphering information from the second reception circuit, a cipher mode selection circuit for selecting cipher mode information specification by the control means at the time of transmission and selecting the cipher mode information detected by the cipher mode detection circuit from the information set in the holding means at the time of reception, and a cipher engine circuit for enciphering the data to be transmitted in the cipher mode selected in the cipher mode selection circuit and outputting the enciphered data at the time of transmission and deciphering the received data in the cipher mode selected in the cipher mode selection circuit at the time of reception, a first transmission circuit for generating time information to output received data on a receiving side to an application side, adding to the time information the enciphering information, and storing the result in the second storing means along with the enciphered data, and a second transmission circuit for reading enciphered data to which has been added time information and enciphering information stored in the second storing means, generating packet data in a predetermined format, setting the enciphering information in the packet header and transmitting the result to the serial interface bus and, when transmitting a plurality of packets, confirming the continuity of the cipher mode from the enciphering information, stopping the transmission when confirming a discontinuity even if there is room in a band enabling transmission in the predetermined time cycle, and transmitting the data enciphered by a different cipher mode to the serial interface bus as packet data in the next cycle.

According to the present invention, data to be transmitted is enciphered in a cipher mode designated in the cipher processing circuit.

Then, the enciphered data is temporarily stored in, for example, a storing means along with the enciphering information.

The data is read from the storing means by a transmission circuit, and the enciphering information is set in a header of the packet in a predetermined format and sent to a serial interface bus in a predetermined time cycle along with the enciphered data.

In the data transmission, continuity of the cipher mode is confirmed in the transmission circuit from the enciphering information from the cipher processing circuit when transmitting a plurality of packets.

When discontinuity is confirmed as a result, the transmission is suspended even if there is room in a band enabling transmission in a predetermined time cycle, and the data enciphered in a different cipher mode is transmitted to the above serial interface as packet data in the next cycle.

Also, according to the present invention, packet data transmitted to the serial interface bus is input to the receiving circuit.

In the receiving circuit, the enciphering information and enciphered data are extracted from the received packet data and stored in, for example, a storing means.

The enciphering information and the enciphered information stored in the storing means are read out to the cipher processing circuit.

Then, in the cipher processing circuit, the received enciphered data is deciphered based on the read enciphering information and output to an application side.

BRIEF DESCRIPTION OF THE DRAWINGS

These and other objects and features of the present invention will become clearer from the following description of the preferred embodiments given with reference to the accompanying drawings, in which:

FIGS. 2A and 2B are views, for explaining an example of a cipher mode and a cipher key according to the present invention;

FIG. 3 is a block diagram of an example of the configuration of a cipher processing circuit according to the present invention;

FIGS. 4A and 4B are views of an embodiment of ciphering information to be added when storing enciphered data in an FIFO;

FIG. 5 is a view for explaining an example of setting enciphering information to a 1394 header at the time of transmission;

FIG. 6 is a view of an example wherein a cipher mode continuity discrimination circuit is provided in a transmission post-processing circuit according to the present invention;

FIGS. 7A to 7D are views of a communication mode when transmitting one packet in one cycle;

FIGS. 8A to 8D are views of a communication mode when transmitting a plurality of data in one cycle but a cipher mode continuity discrimination circuit is not provided;

FIGS. 9A to 9D are views of a communication mode when transmitting a plurality of data in one cycle and a cipher mode continuity discrimination circuit is provided;

FIGS. 10A and 10B are views of byte sizes of one source packet in isochronous communication, wherein FIG. 10A is a view of a packet size in a DVB specification and FIG. 10B is a view of a packet size in a DSS specification.

FIG. 11 is a view of an example of the correspondence of original data and packets to be actually transmitted when transmitting data in isochronous communication of the IEEE 1394 standard;

DESCRIPTION OF THE PREFERRED EMBODIMENTS

Below, preferred embodiments will be described with reference to the accompanying drawings.

Figure 1:
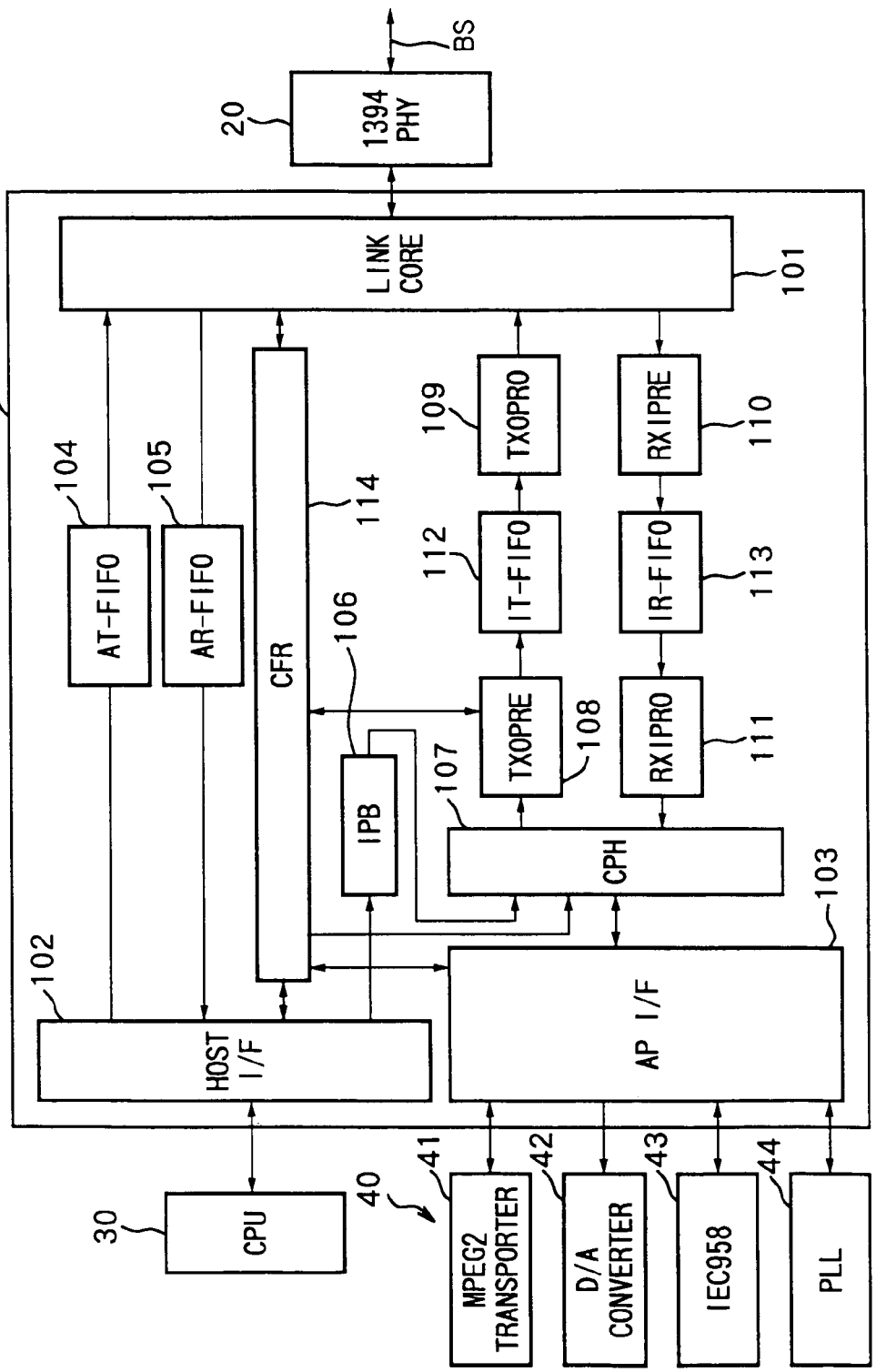
FIG. 1 is a block diagram of the configuration of an embodiment of an MPEG signal processing circuit according to the present invention adopted in an IEEE 1394 serial interface.
Figure 12:
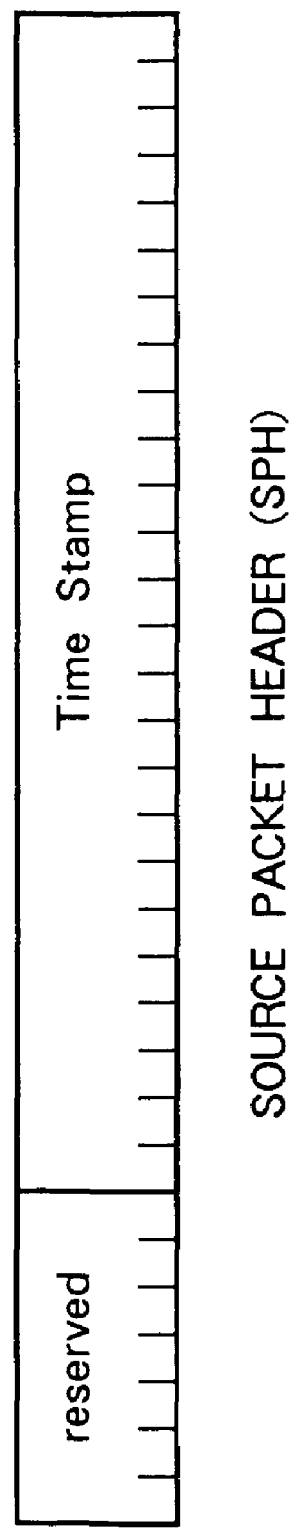
FIG. 12 is a view of a format of a source packet header.

FIG. 1 is a block diagram of the configuration of an embodiment of a signal processing circuit adopted in an IEEE 1394 serial interface according to the present invention.

The signal processing circuit comprises a link layer circuit 10, a physical layer circuit 20, and a CPU 30 as a host computer. An application side circuit 40 is connected to the link layer circuit 10.

The application circuit 40 comprises, as shown in FIG. 1, an MPEG transporter 41, a digital/analog (D/A) converter 42, and an IEC 958 digital audio circuit 43. Also, reference number 44 indicates a PLL circuit serving as a clock supply circuit.

Note that the application side circuit 40 will be explained as an MPEG transporter 41 below.

The link layer circuit 10 controls asynchronous transfer and isochronous transfer and controls the physical layer circuit 20 under control of the CPU 30.

Specifically, as shown in FIG. 1, the link layer circuit 10 comprises a link core 101, a host interface (Host I/F) 102, an application interface circuit (AP I/F) 103, a transmission FIFO for asynchronous communication (AT-FIFO) 104, a reception FIFO for asynchronous communication (AR-FIFO) 105, an inset packet buffer (IPB) 106, a cipher processing circuit (CPH) 107, a transmission pre-processing circuit for isochronous communication as a first transmission circuit (TXOPRE) 108, a transmission post-processing circuit for isochronous communication as a second transmission circuit (TXOPRO) 109, a reception pre-processing circuit for isochronous communication as a first receiving circuit (TXIPRE) 110, a reception post-processing circuit for isochronous communication as a second receiving circuit (TXIPRO) 111, a transmission FIFO for isochronous communication (IT-FIFO) 112, a reception FIFO for isochronous communication (IR-FIFO) 113, and a configuration register as a storing means (hereinafter referred to as a CFR) 114.

In the circuit in FIG. 1, an asynchronous communication system circuit is composed of the host interface circuit 102, the transmission FIFO 104, the reception FIFO 105, and the link core 101.

An isochronous communication system circuit is composed of the application interface circuit 103, the cipher processing circuit 107, the transmission pre-processing circuit 108, the transmission post-processing circuit 109, the reception pre-processing circuit 110, the reception post-processing circuit 111, the transmission FIFO 112, the reception FIFO 113, and the link core 101.

The link core 101 is configured by a transmission circuit and reception circuit for an asynchronous communication packet and an isochronous communication packet, an interface circuit with the physical layer circuit 20 for directly driving an IEEE 1394 serial bus BS for the packets, a cycle timer reset every 125 μs, a cycle monitor, a CRC circuit, etc. For example, time data etc. of the cycle timer, etc. is supplied to the isochronous communication system processing circuit via the CFR 111.

The host interface circuit 102 mainly performs arbitration for writing and reading of asynchronous communication packets between the CPU 30 as a host computer, the transmission FIFO 104, and the reception FIFO 105 and arbitration for transferring a variety of data between the CPU 30 and the CFR 114.

For example, a plurality of modes (keys) for enciphering isochronous packets, which will be explained below, are set from the CPU 30, one of the set cipher modes is selected, and cipher key selection information for the cipher processing circuit 107 to encipher is set to the CFR 114 via the host interface 102.

Also, for example, a delay time for a time stamp Txdelay set to the SPH (source packet header) of the isochronous communication packet is set from the CPU 30 to the CFR 141 via the host interface 102.

Furthermore, for example, a logic "1" is set to a register IPTxGo of the CFR 114 from the CPU 30 when it becomes necessary to insert packet data of a control packet in normal MPEG transport stream data.

The application interface circuit 103 performs arbitration for transferring pre-enciphered data and post-deciphered data including a control signal etc. between the application side circuit 40, for example, the MPEG transporter 41, and the cipher processing circuit 107.

An asynchronous communication packet to be transmitted to the IEEE 1394 serial bus BS is stored in the transmission FIFO 104, while an asynchronous communication packet transferred via the IEEE 1394 serial interface bus BS is stored in the reception FIFO 105.

For example, desired packet data is written in the insert packet buffer 106 from the CPU 30.

The capacity of the insert packet buffer 106 is, for example, 188 bytes. Data up to 188 bytes is valid, while data exceeding the capacity is not transferred.

When the data to be transferred is 188 bytes or less, the data except for the written data is transferred set to "1".

The value of the data once written in the insert packet buffer 106 is kept until re-written.

The data written in the insert packet buffer 106 is enciphered in the cipher processing circuit 107 and transferred to the transmission FIFO 112 via the transmission pre-processing circuit 108. The above register IPTxGo of the CFR 114 is set to "1" at the time of transfer, while is automatically set to "0" when the transfer is completed. The CPU 30 confirms the completion of transfer by confirming this.

The cipher processing circuit 107 selects one cipher key among a plurality of cipher modes (keys) set from the CPU 30 to the CFR 114 at transferring data based on the cipher key selection information set from the CPU 30 to the CFR 114, ciphers data to be transmitted input via the application interface circuit 103 in, for example, a predetermined common key cipher mode using the selected cipher key, and outputs the same to the transmission pre-processing circuit 108.

Also, the cipher processing circuit 107 detects the cipher mode (key) used for enciphering the enciphered data input via the reception post-processing circuit 111, deciphers the enciphered data based on the cipher key information, and outputs the result to the application interface 103.

Here, an example of the cipher mode and the cipher key will be explained with reference to FIGS. 2A and 2B.

As shown in FIG. 2A, there are three kinds of cipher modes: mode A, mode B, and mode C. There is also "no enciphering" in addition to them.

The contents of the cipher modes A, B, and C are as follows:

The cipher mode A is "never copy" which permits no copying, the cipher mode B is "copy once" which permits copying only once, and the cipher mode C is "no more copy" which permits no further copying and enciphering.

Also, there are two kinds of keys, that is, even keys and odd keys, as shown in FIG. 2B.

Accordingly, as a cipher key for enciphering, there are six kinds of combinations, that is, (1) mode A and an odd key, (2) mode A and an even key, (3) mode B and an odd key, (4) mode B and an even key, (5) mode C and an odd key, and (6) mode C and an even key.

FIG. 3 is a block diagram of an example of the configuration of the cipher processing circuit 107.

The cipher processing circuit 107 comprises, as shown in FIG. 3, a cipher mode selection circuit 1071, a cipher mode detection circuit 1072, a multiplexer 1073, and a cipher engine circuit 1074.

The cipher mode selection circuit 1071 selects one of the six cipher modes (keys) set from the CPU 30 to the CFR 114 based on a cipher key selection signal (information) S114 set from the CPU 30 to the CFR 114 and outputs this to the cipher engine circuit 1074.

At the time of receiving data, the cipher mode selection circuit 1071 selects one of the six cipher modes (key) set to the CFR 114 from the CPU 30 based on a cipher key selection signal S1072 from the cipher mode detection circuit 1072 and outputs this to the cipher engine circuit 1074.

The cipher mode detection circuit 1072 detects a cipher mode (key) used in enciphering data from the enciphering information input via the reception post-processing circuit 111 and outputs the detected result as a cipher key selection signal S1072 to the cipher mode selection circuit 1071.

The multiplexer 1073, at the time of transmission, makes the transmission data be input via the application interface circuit 103 to the cipher engine circuit 1074, while, at the time of reception, makes the reception data enciphered by the reception post-processing circuit 111 be input to the cipher engine circuit 1074.

The cipher engine circuit 1074, at the time of transmission, enciphers the transmission data input via the multiplexer 1073 based on a cipher key specified by the cipher mode selection circuit 1071 and outputs the result to the transmission pre-processing circuit 108 along with its enciphering information, while, at the time of reception, deciphers the reception data input via the multiplexer 1073 based on the cipher key specified by the cipher mode selection circuit 1071 and outputs the result to the application interface circuit 103.

The transmission pre-processing circuit 108 receives enciphered data to be transmitted from the cipher processing circuit 107, adjusts the data length to the quadlet unit (4 bytes) for isochronous communication of the IEEE 1394 standard, adds a source packet header (SPH) of 4 bytes (+4 bits), and stores the result in the transmission FIFO 112.

When storing the transmission data in the transmission FIFO 112, as shown in FIG. 4A, the transmission pre-processing circuit 108 adds 4 bits (32nd to 36th bits) to the 4 bytes (0 to 31st bits) of the source packet header, wherein 3 bits, that is, the 33rd bit, 34th bit, and 35th bit, are used for setting the enciphering information, and stores the transmission data. At the same time, as shown in FIG. 4B, the transmission pre-processing circuit 108 adds 4 bits (32nd to 36th bits) in the same way to a data payload indicating the maximum length of 4 bytes (0 to 31st bits) of the data region, wherein 3 bits, that is, the 33rd bit, 34th bit, and 35th bit, are used for setting the enciphering information, and stores the result.

In the enciphering information, the mode is indicated by two bits, that is, bits [35:34], and the kind of the key is indicated by one bit, that is, the bit [33]. The three bits are set to be sy[3:2] and sy[1] as shown in FIGS. 2A and 2B in accordance with the contents. Note that the 32nd bit is left unused.

Namely, [111] is set in the case of mode A and an even key, [101] in the case of mode B and an even key, [011] in the case of mode C and an even key, [110] in the case of mode A and an odd key, [100] in the case of mode B and an odd key, and [010] in the case of mode C and the odd key.

In the case of "no enciphering", the bits [35:34] are set to be [00]. The bit [33] does not mean anything at this time.

Also, the transmission pre-processing circuit 108 sets a time stamp for determining the data output time of the receiving side when adding the source packet data in the way explained below.

First, a value of an internal cycle register is latched at the timing of receiving the end data of the packet from the application side circuit 40, for example, an MPEG transporter 41.

Next, a delay time Txdelay set to the CFR 114 from the CPU 30 via the host interface 102 is added to the value of the above cycle register.

Then, the added value is inserted (set) as a time stamp in the source packet header of the receipt packet.

FIG. 4A is a view for explaining the specific configuration of the time stamp in the source packet header.

As shown in FIG. 4A, the time stamp for determining the data output time on the receiving side is 25 bits and indicates the current time.

Namely, the time stamp is configured by 25 bits, wherein the lower 12 bits are assigned as a cycle-offset CO region and the upper 13 bits are assigned as a cycle-count CC region.

The cycle-offset counts 125 $\mu$s (clock CLK=24.576 MH$_z$) of 0 to 3071 (12$b$ 101111111111), while the cycle-count counts one second of 0 to 7999 (13$b$ 1111100111111).

Accordingly, in principle, the lower 12 bits of the time stamp never indicate 3072 or more and the upper 13 bits never indicate 8000 or more.

Figure 13:
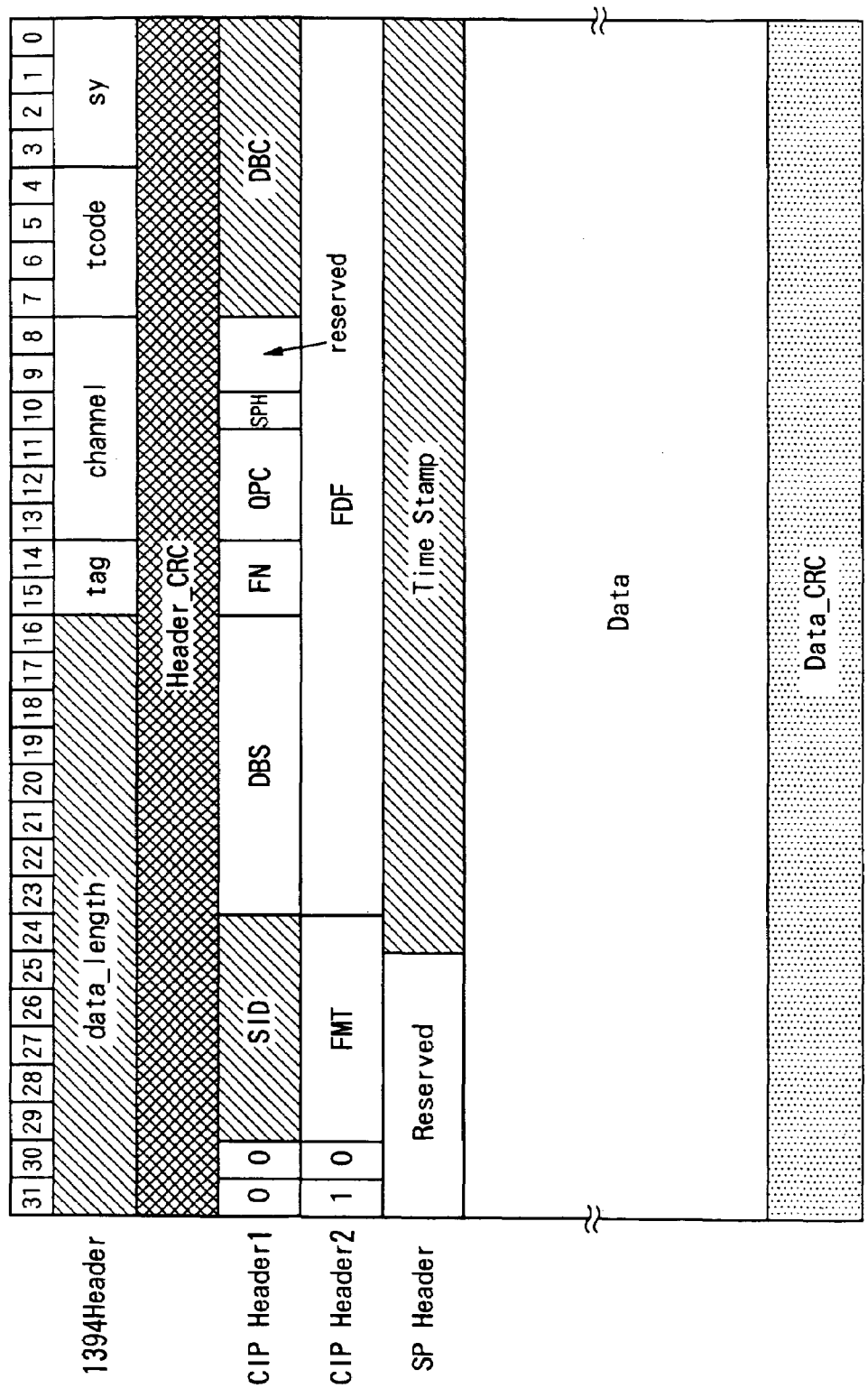
FIG. 13 is a view of an example of the basic configuration of a packet for isochronous communication.
Figure 14:
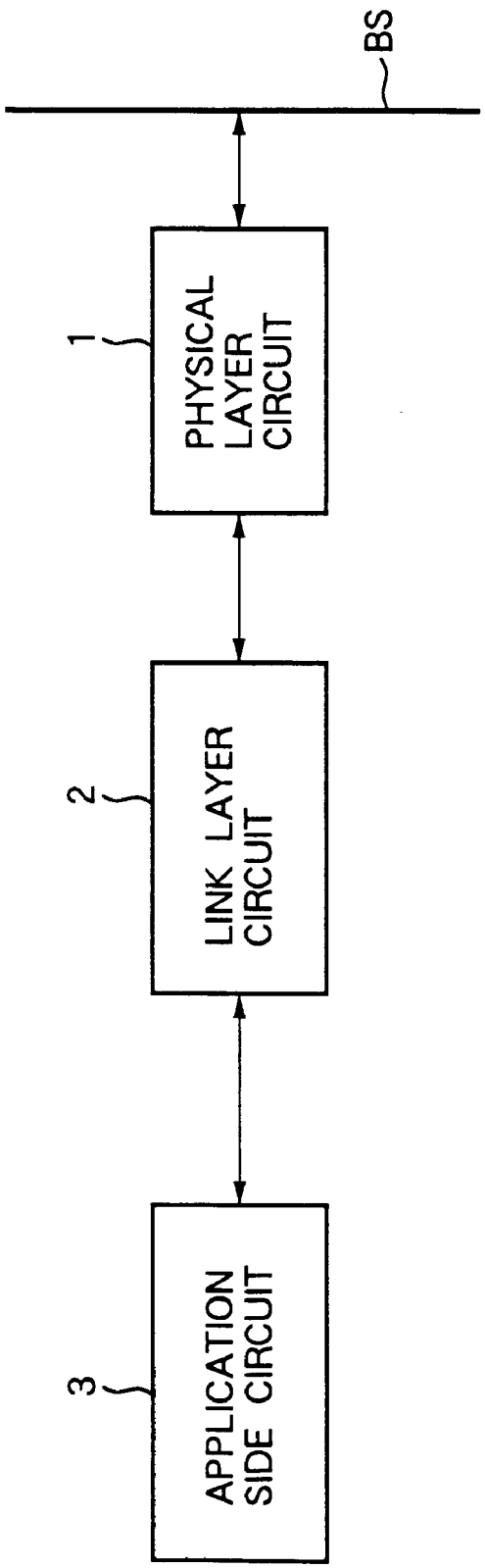
FIG. 14 is a block diagram of the basic configuration of an isochronous communication system circuit in an IEEE 1394 serial interface.

The transmission post-processing circuit 109 adds a 1394 header and CIP headers 1 and 2 to the data including the source packet header stored in the transmission FIFO 112 as shown in FIGS. 5 and 13 and outputs the result to the transmission circuit of the link core 101.

Specifically, the 1394 header, as shown in FIG. 5, composed of a data-length region indicating the data length, a channel region indicating the channel number (one of 0 to 63) the packet is to be transferred, a tcode region indicating the processing code, and sy region indicating the enciphering information, the CIP header 1, as shown in FIG. 13, composed of an SID (source node ID) region for the transmission node number, a DBS (data block size) region for a length of the data block, an FN (fraction number) region for the fraction number in packaging, a QPC (quadlet padding count) region for the quadlet number of the padding data, an SPH region for a flag indicating an existence of the source packet header, a DBC region for a counter for detecting the number of the isochronous packet, and the CIP header 2 composed of an FMT region for a signal format indicating the kind of data to be transferred and an FDF (format dependent field) region used corresponding to the signal format are added.

Note that the enciphering information sy set in the 1394 header is assigned three bits of the 1394 header, bits [3, 2, 1]. The contents are set based on the enciphering information added to the source packet header stored in the FIFO 112.

In the enciphering information, the mode is indicated by two bits, that is, the bits [3:2], and the kind of the key is indicated by one bit, that is, the bit [1]. The three bits are set as in FIGS. 2A and 2B, that is, sy[3:2] and sy[1], in accordance with the contents.

Namely, [111] is set in the case of mode A and an even key, [101] in the case of mode B and an even key, [011] in the case of mode C and an even key, [110] in the case of mode and an odd key, [100] in the case of mode B and an odd key, and [010] in the case of mode C and an odd key.

In the case of "no enciphering", the bits [3:2] are set to [00]. The bit [1] does not mean anything at this time.

The transmission post-processing circuit 109, at the time of transmitting a plurality of packets as shown in FIG. 6, confirms the continuity of the cipher mode when reading the transmission data from the FIFO 112 and stops the transmission when a discontinuity is confirmed even if there is a room in the band enabling transmission at the transmission cycle of the 1394 standard. The transmission post-processing circuit 109 has a cipher mode continuity discrimination circuit 1091 for instructing the transmission circuit of the link core 101 to transmit the packet enciphered by a different cipher key in the next cycle.

The reason for providing the cipher mode continuity discrimination circuit 1091 will be explained below.

As shown in FIGS. 7A to 7D, when transmitting only one packet within one cycle of the 1394 standard, even if the cipher mode is switched, for example from mode A/even to mode A/odd, the receiving side can discriminate the cipher mode and decipher the data since the enciphering information is added to the sy region of the 1394 header in the respective packets.

On the other hand, when enciphering and transmitting a plurality of packets, if the cipher mode continuity discrimination circuit 1091 is not provided as shown in FIGS. 8A to 8D, data enciphered by different cipher keys will be mixed together within one cycle of the 1394 standard due to the switching timing.

At this time, since only one 1394 header is added to the data mixed together, the receiving side cannot discriminate the plurality of cipher modes and becomes unable to decipher the data.

Thus, provision is made of the cipher mode continuity discrimination circuit 1091 to confirm the continuity of the cipher mode when reading the transmission data from the FIFO 112 at the time of transmitting a plurality of packets, to stop the transmission when discontinuity is confirmed even if there is room in the band region enabling transmission in the transmission cycle of the 1394 standard, and to instruct the transmission circuit of the link core 101 to transmit a packet enciphered by a different cipher key in the next cycle so as to transmit only the data enciphered by one cipher mode within one cycle of the 1394 standard as shown in FIGS. 9A to 9D and to transmit the data enciphered in the different cipher mode in the next cycle.

The reception pre-processing circuit 110 receives the isochronous communication packet transferred by the IEEE 1394 serial bus via the link core 101, analyzes the contents of the 1394 header, CIP headers 1 and 2, etc. of the received packet, adds a source packet header (SPH) of four bytes (+4 bits), and stores the result in the reception FIFO 113.

The reception pre-processing circuit 110, at the time of storing the received data in the reception FIFO 113, adds the enciphering information set in the bits 3, 2, 1 of the sy region of the 1394 header of the received packet to the source packet header and data to be stored in the same way as in the transmission pre-processing circuit 108.

Namely, as shown in FIG. 4A, four bits (32nd to 36th bits) are added to the source packet header of four bytes (0 to 31st bits), and three bits, that is, the 33rd bit, 34th bit, and 35th bit, in the added bits are used for setting the enciphering information for the storage. At the same time, as shown in FIG. 4B, four bits (32nd to 36th bits) are added in the same way to a data payload indicating the maximum length of 4 bytes (0 to 31st bits) of the data region, and 3 bits, that is, the 33nd bit, 34th bit, and 35th bit, are used for setting the enciphering information for storage.

In the enciphering information, the mode is indicated by two bits, that is, the bits [35:34], and the kind of the key is indicated by one bit, that is, the bit [33]. The three bits are set to be sy[3:2] and sy[1] as shown in FIGS. 2A and 2B in accordance with the contents. Note that the 32th bit is left unused.

Namely, [111] is set in the case of mode A and an even key, [101] in the case of mode B and an even key, [011] in the case of mode C and an even key, [110] in the case of mode A and an odd key, [100] in the case of mode B and an odd key, and [010] in the case of mode C and an odd key.

In the case of "no enciphering", the bits [35:34] are set to [001].

The bit [33] does not mean anything at this time.

The reception post-processing circuit 111 reads the source packet header and the data stored in the reception FIFO 113, outputs the added enciphering information to the cipher mode detection circuit 1072 of the cipher processing circuit 107, and inputs the enciphered data to the cipher engine circuit 1074 via the multiplexer 173.

Also, the reception post-processing circuit 111 at the time of reading data reads the time data of the time stamp of the source packet header stored in the FIFO 113, compares the read time stamp data (TS) with the cycle time (CT) by the cycle timer inside the link core 101, and, when the cycle time CT is larger than the time stamp data TS, outputs the data deciphered in the cipher engine circuit 1074 as, for example, MPEG transport stream data to the MPEG transporter 41 via the application interface circuit 103.

A transmission operation and a reception operation of an isochronous communication packet to be transferred by the IEEE 1394 serial interface bus BS will be explained next.

First, a plurality of modes (keys) for enciphering an isochronous packet are set to the CFR 114 from the CPU 30.

Then, when transmitting the isochronous communication packet to the IEEE serial interface bus BS, one of the set cipher modes is selected, and cipher key selection information for the enciphering by the cipher processing circuit 107 is set to the CFR 114 from the CPU 30 through the host interface 102. Also, the time stamp delay time Txdelay set in the SPH of the isochronous communication packet is set in the CFR 114 from the CPU through the host interface 102.

In parallel with this, for example the MPEG transport stream data of the MPEG transporter 41 of the application side circuit 40 is input to the cipher processing circuit 107 via the application interface circuit 103.

In the cipher processing circuit 107, at the time of transmission, the transmission data arriving via the application interface 103 is input to the cipher engine circuit 1074 via the multiplexer 1073.

Also, in the cipher mode selection circuit 1071, one of the six cipher modes (keys) set in the CFR 114 from the CPU 30 is selected based on the cipher mode selection signal (information) S114 set to the CFR 114 from the CPU 30. The information is supplied to the cipher engine circuit 1074.

In the cipher engine circuit 1074, the transmission data input via the multiplexer 1073 is enciphered based on the cipher key specified by the cipher mode selection circuit 1071 and output to the transmission pre-processing circuit 108.

In the transmission pre-processing circuit 108, enciphered data to be transmitted is received from the cipher processing circuit 107, the data length is adjusted to be the quadlet unit (4 bytes) for isochronous communication of the IEEE 1394 standard, and a source packet header (SPH) of 4 bytes (+4 bits) is added and the result stored in the transmission FIFO 112.

When storing the transmission data in the transmission FIFO 112, the transmission pre-processing circuit 108 adds 4 bits (32nd to 36th bits) to the 4 bytes (0 to 31st bits) of the source packet header and uses 3 bits, that is, the 33rd bit, 34th bit, and 35th bit, in them for setting the enciphering information. At the same time, 4 bits (32nd to 36th bits) are added in the same way to a data payload indicating the maximum length of 4 bytes (0 to 31st bits) of the data region, and 3 bits, that is, the 33nd bit, 34th bit, and 35th bit, in them are used for setting the enciphering information for storage.

The transmission data stored in the FIFO 112 is read by the transmission post-processing circuit 109, the data including the source packet data is given the 1394 header and CIP headers 1 and 2, and the result is output to the transmission circuit of the link core 101.

At this time, the enciphering information sy set in the added bits is assigned to three bits [3, 2, 1] of the 1394 header. Note that the contents are set based on the enciphering information added to the source packet header stored in the FIFO 112.

Then, the packet data input to the transmission circuit of the link core 101 is transmitted as an isochronous communication packet to the 1394 serial interface bus via the physical layer circuit 20.

When a plurality of packets are enciphered and transmitted, the continuity of the cipher mode is confirmed at the time of reading the transmission data from the FIFO 112 in the cipher mode continuity discrimination circuit 1091 in the transmission post-processing circuit 109.

Then, when a discontinuity is confirmed, the transmission is suspended even if there is room in the band enabling transmission in the transmission cycle of the 1394 standard, and an instruction is sent to the transmission circuit of the link core 101 to transmit the packet enciphered by the different cipher key in the next cycle.

As a result, only the data enciphered by one cipher mode is transmitted within one cycle of the 1394 standards, and data enciphered by a different cipher mode is transmitted in the next cycle.

Therefore, the receiving side can read the cipher appropriately and the data can be deciphered.

The isochronous communication packet transmitted via the IEEE 1394 serial bus BS and set with the enciphering information in the 1394 header is input to the reception pre-processing circuit 110 via the physical layer circuit 10 and the link core 101.

In the reception pre-processing circuit 110, the contents of the 1394 header and the CIP headers 1 and 2 are analyzed and the source packet header and the data are written to the FIFO 113.

At this time in the reception pre-processing circuit 110, when storing the received data in the reception FIFO 113, 4 bits (32nd to 36th bits) are added to the 4 bytes (0 to 31st bits) of the source packet header, and three bits, that is, the 33rd bit, 34th bit, and 35th bit, in them are used for setting the enciphering information, while 4 bits (32th to 36th) are added in the same way to the data payload indicating the maximum length of four bytes (0 to 31st bits) of the data region, and three bits, that is, the 33rd bit, 34th bit, and 35th bit, in them are used for setting the enciphering information for storage.

Then, the source packet header and the received data stored in the FIFO 113 are read by the reception post-processing circuit 111, the enciphering information in the added bits is supplied to the cipher mode detection circuit 1072 of the cipher processing circuit 107, and the enciphered data is supplied to the cipher engine circuit 1074 via the multiplexer 173.

Also, in the reception post-processing circuit 111, the time data of a time stamp in the source packet header stored in the FIFO 113 is read, and the read time stamp data (TS) and the cycle time (CT) of the cycle timer inside the link core 101 are compared. When the cycle time CT is larger than the time stamp data TS, a data output instruction is supplied to the cipher engine circuit 1074 of the cipher processing circuit 107.

In the cipher processing circuit 107, the cipher mode detection circuit 1072 detects the cipher mode (key) used for enciphering the data from the enciphering information added to the enciphered data input via the reception post-processing circuit 111. Then, the detected result is output as a cipher key selection signal S1072 to the cipher mode selection circuit 1071.

In the cipher mode selection circuit 1071, one of six cipher modes (keys) set to the CFR 114 from the CPU 30 is selected based on the cipher key selection signal S1072 and the information is supplied to the cipher engine circuit 1074.

In the cipher engine circuit 1074, the received data input via the multiplexer 1073 is deciphered based on the cipher key specified by the cipher mode selection circuit 1071.

Then the deciphered data is output, for example, as MPEG transport stream data to the MPEG transporter 41 via the application interface circuit 103 at the instructed time by the reception post-processing circuit 111.

As explained above, according to the present embodiment, when transmitting data, one of the six cipher modes set to the CFR 114 from the CPU 30 is selected based on the cipher key selection signal S114 set to the CFR 114 from the CPU 30. When receiving data, the cipher processing circuit 107 including the cipher mode selection circuit 1071 for selecting one cipher key among the six cipher modes set to the CFR 114 from the CPU 30 based on the cipher key selection signal S1072 from the cipher mode detection circuit 1072, the cipher mode detection circuit 1072 for detecting the cipher mode used for enciphering the data from the enciphering information added to the received packet and outputting the detected result as a cipher key selection signal S1072 to the cipher mode selection circuit 1071, and the cipher engine circuit 1074 for enciphering the transmission data input via the multiplexer 1073 based on the cipher key specified by the cipher mode selection circuit 1071 at the time transmission and for deciphering the received enciphered data input via the multiplexer 1073 based on the cipher key specified by the cipher mode selection circuit 1071 at the time of reception, and the transmission post-processing circuit 109 for setting the enciphering information to the 1394 header and outputting the result as a predetermined transmission packet at the time of transmission are provided. Therefore, it is possible to prevent illicit copying of digital data transferred between separate apparatuses. Moreover, there is an advantage that a preferable isochronous communication can be realized.

Also, in the present embodiment, the cipher mode continuity discrimination circuit 1091 is provided and confirms the continuity of the cipher mode at the time of reading the transmission data from the FIFO 112 when transmitting a plurality of data, stops transmission when a discontinuity is confirmed even if there is a room in the band enabling transmission in the transmission cycle of the 1394 standard, and instructs the transmission circuit of the link core 101 to transmit the packet enciphered by a different cipher key at the next cycle. Thus, since it is configured so that only the data enciphered by one cipher mode is transmitted in one cycle of the 1394 standard and the data enciphered by a different cipher mode is transmitted in the next cycle, it is possible to prevent the receiving side from being unable to discriminate a plurality of cipher modes and unable to decipher and therefore the receiving side can decipher correctly in accordance with the cipher mode.

Note that in the present embodiment, an MPEG transport stream data was explained as an example of the application side data, however, the present invention is not limited to this. Needless to say the present invention can be applied to every type of digital data such as digital audio, etc.

As explained above, according to the present invention, it is possible to prevent illicit copying of digital data transferred between separate apparatuses and also is possible to realize a signal processing circuit which can prevent a situation where the receiving side cannot discriminate a plurality of cipher modes and is unable to decipher so the receiving side can correctly decipher the received data.

While the invention has been described with reference to specific embodiment chosen for purpose of illustration, it should be apparent that numerous modifications could be made thereto by those skilled in the art without departing from the basic concept and scope of the invention.

What is claimed is:

1. A signal processing circuit for transmitting data as packet data to a serial interface bus in a predetermined time cycle, comprising:

a cipher processing circuit for enciphering the data to be transmitted by one of a number of predetermined cipher modes, in which one of said predetermined cipher modes is a copy once prohibition mode wherein the data can not be reproduced more than once; and a transmission circuit for adding enciphering information representative of the cipher mode to the data enciphered in the cipher processing circuit, and transmitting the enciphered data and the enciphering information to the serial interface bus, and for determining whether the cipher mode and the enciphering information correspond, and when the cipher mode and enciphering information are determined not to correspond transmitting the data enciphered by a different cipher mode to the serial interface bus as packet data in another cycle.

2. A signal processing circuit as set forth in claim 1, wherein the transmission circuit sets the enciphering information in a predetermined region of a header of the packet.

3. A signal processing circuit for transmitting data as packet data to a serial interface bus in a predetermined time cycle, comprising:
- a holding means in which information of at least one of a number of cipher modes is set, wherein one of said cipher modes is a copy once prohibition mode wherein the data can not be reproduced more than once;
- a control means for specifying a cipher mode for enciphering the data for transmission;
- a cipher processing circuit including a cipher mode selection circuit for accessing the cipher mode information specified by the control means from the holding means;
- a cipher engine circuit for enciphering the data to be transmitted in the cipher mode selected in the cipher mode selection circuit and outputting the enciphered data;
- a transmission circuit for adding enciphering information representative of the cipher mode to the enciphered data in the cipher processing circuit, and transmitting the enciphered data and enciphering information to the serial interface bus; and for determining whether the cipher mode and the enciphering information correspond, and when the cipher mode and enciphering information are determined not to correspond transmitting the data enciphered by a different cipher mode to the serial interface bus as packet data in another cycle.

4. A signal processing circuit as set forth in claim 3, wherein the transmission circuit sets the enciphering information in a predetermined region of a header of the packet.

5. A signal processing circuit for transmitting data as packet data to a serial interface bus in a predetermined time cycle, comprising:
- a storing means;
- a holding means in which information of at least one of a number of cipher modes is set, wherein one of said cipher modes is a copy once prohibition mode wherein the data can not be reproduced more than once;
- a control means for specifying a cipher mode for enciphering the transmission data;
- a cipher processing circuit including a cipher mode selection circuit for accessing the cipher mode information specified by the control means from the holding means
- a cipher engine circuit for enciphering the data to be transmitted in the cipher mode accessed in the cipher mode selection circuit and outputting enciphered data;
- a first transmission circuit for generating time information adding to the time information the enciphering information, and storing the result in the storing means along with the enciphered data; and
- a second transmission circuit for reading enciphered data to which has been added time information and enciphering information stored in the storing means, generating packet data in a predetermined format, setting the enciphering information in the packet header, and transmitting the result to the serial interface bus and, when transmitting a plurality of packets, confirming continuity of the cipher mode from the enciphering information, stopping the transmission when the cipher mode and the enciphering information are determined not to correspond even if there is room in a band enabling transmission in the predetermined time cycle, and transmitting the data enciphered by a different cipher mode to the serial interface bus as packet data in a next cycle.

6. A signal processing circuit for transmitting and receiving data as enciphered packet data to and from a serial interface bus in a predetermined time cycle comprising:
- a cipher processing circuit for enciphering the data to be transmitted by one of a number of a predetermined cipher modes at the time of transmission, wherein one of said predetermined cipher modes is a copy once prohibition mode wherein the data can not be reproduced more than once, and deciphering received enciphered data based on the enciphering information included in a received packet data at the time of reception; and
- a transmission circuit for adding the enciphering information to the data enciphered in the cipher processing circuit, transmitting the result to the serial interface bus, confirming the continuity of the cipher mode by the enciphering information when transmitting a plurality of packets, and transmitting the data enciphered by a different cipher mode to the serial interface bus as packet data in another cycle when the cipher mode and the enciphering information are determined not to correspond.

7. A signal processing circuit as set forth in claim 6, wherein the transmission circuit sets the enciphering information in a predetermined region of a header of the packet.

8. A signal processing circuit for transmitting and receiving data as enciphered packet data to and from a serial interface bus in a predetermined time cycle, comprising:
- a first storing means;
- a second storing means;
- a holding means in which information of at least one of a number of cipher modes is set, wherein one of said cipher modes is a copy once prohibition mode wherein the data can not be reproduced more than once;
- a control means for specifying a cipher mode for enciphering the transmission data;
- a first reception circuit for storing time information, enciphered data and the enciphering information of received packet data in the first storing means;
- a second reception circuit for outputting the enciphering information and the enciphered data stored in the first storing means and indicating a time for outputting the received data based on the time information;
- a cipher processing circuit including a cipher mode detection circuit for detecting a cipher mode used for enciphering data by the enciphering information from the second reception circuit;
- a cipher mode selection circuit for accessing cipher mode information specified by the control means at the time of transmission and selecting the cipher mode information detected by the cipher mode detection circuit from the information set in the holding means at the time of reception;
- a cipher engine circuit for enciphering the data to be transmitted in the cipher mode accessed in the cipher mode selection circuit, outputting the enciphered data at the time of transmission and deciphering the received data in the cipher mode accessed in the cipher mode selection circuit at the time of receptions;
- a first transmission circuit for generating time information adding to the time information the enciphering information, and storing the result in the second storing means along with the enciphered data; and a second transmission circuit for reading enciphered data to which has been added time information and enciphering information stored in the second storing means, generating packet data in a predetermined format, setting the enciphering information in the packet header and transmitting the result to the serial interface bus and, when transmitting a plurality of packets, confirming the continuity of the cipher mode from the enciphering information, stopping the transmission when the cipher mode and the enciphering information are determined not to correspond even if there is room in a band enabling transmission in the predetermined time cycle, and transmitting the data enciphered by a different cipher mode to the serial interface bus as packet data in a next cycle.

* * * * *